(12) United States Patent
Arutla et al.

(10) Patent No.: US 7,958,450 B1
(45) Date of Patent: Jun. 7, 2011

(54) MATCHING USER INTERFACE

(75) Inventors: Keerthi K. Arutla, Fremont, CA (US); John D. Panelli, Campbell, CA (US); Suppakit Maneeroj, Daly City, CA (US)

(73) Assignee: EMC Corporation, Hopkinton, MA (US)

( * ) Notice: Subject to any disclaimer, the term of this patent is extended or adjusted under 35 U.S.C. 154(b) by 1199 days.

(21) Appl. No.: 11/640,671

(22) Filed: Dec. 18, 2006

(51) Int. Cl.
G06F 15/177 (2006.01)

(52) U.S. Cl. ........ 715/735; 715/736; 709/220; 709/221; 709/222

(58) Field of Classification Search .................. 715/735, 715/736; 709/220–222
See application file for complete search history.

(56) References Cited

U.S. PATENT DOCUMENTS

| | | | | |
|---|---|---|---|---|
| 5,675,831 A * | 10/1997 | Caputo | ........................... | 710/10 |
| 7,203,730 B1 * | 4/2007 | Meyer et al. | .................. | 709/213 |
| 7,512,595 B1 * | 3/2009 | McBride et al. | ....................... | 1/1 |
| 7,609,651 B1 * | 10/2009 | McBride et al. | .............. | 370/252 |
| 2003/0179227 A1 * | 9/2003 | Ahmad et al. | ................ | 345/736 |
| 2007/0038893 A1 * | 2/2007 | Junghans et al. | ............... | 714/30 |
| 2007/0260712 A1 * | 11/2007 | Jibbe | ............................. | 709/220 |

\* cited by examiner

*Primary Examiner* — Tuyetlien T Tran
(74) *Attorney, Agent, or Firm* — Krishnendu Gupta; Gerald P. Kazanjian

(57) ABSTRACT

A matching graphical user interface (GUI) for a storage area network (SAN) management tool is disclosed. The matching GUI allows a user to match a managed object that corresponds to a unit of a SAN with a component of the SAN management tool, so the SAN management tool may validate the configuration of the SAN. The GUI receives information describing a managed object and displays the information and a result of an attempted match of the information with a component. A result indicates a current status of the attempted match. The GUI provides a user-selectable listing of components for the displayed result. The selection of a component from the user-selectable listing of components by a user creates a match between the received information for the unit and the selected component.

14 Claims, 8 Drawing Sheets

FIG. 2

PROVIDE A GRAPHICAL USER INTERFACE THAT ALLOWS A USER TO MATCH A MANAGED OBJECT THAT CORRESPONDS TO A UNIT OF A SAN WITH A COMPONENT OF A SAN MANAGEMENT TOOL, WHEREIN MATCHING ALLOWS THE SAN MANAGEMENT TOOL TO VALIDATE THE CONFIGURATION OF THE SAN OF WHICH THE UNIT IS A PART BY

601 RECEIVE INFORMATION DESCRIBING A MANAGED OBJECT, WHEREIN THE MANAGED OBJECT CORRESPONDS TO A UNIT OF A SAN

602 DISPLAY, ON THE GUI, THE RECEIVED INFORMATION AND A RESULT OF AN ATTEMPTED MATCH OF THE RECEIVED INFORMATION WITH A COMPONENT, WHEREIN A RESULT INDICATES A CURRENT STATUS OF THE ATTEMPTED MATCH

603 PROVIDE, ON THE GUI, A USER-SELECTABLE LISTING OF COMPONENTS FOR THE DISPLAYED RESULT, WHEREIN THE SELECTION OF A COMPONENT FROM THE USER-SELECTABLE LISTING OF COMPONENTS BY A USER CREATES A MATCH BETWEEN THE RECEIVED INFORMATION FOR THE MANAGED OBJECT AND THE SELECTED COMPONENT

604 RECEIVE INPUT FROM A USER, WHEREIN THE INPUT COMPRISES A SELECTION OF A COMPONENT FROM THE USER-SELECTABLE LISTING OF COMPONENTS FOR A RESULT, SUCH THAT THE SELECTION CREATES A MATCH BETWEEN THE RECEIVED INFORMATION FOR THE UNIT AND THE SELECTED COMPONENT

605 IN RESPONSE TO THE INPUT RECEIVED FROM THE USER, PROVIDE A BULK MATCHING DIALOG THAT INDICATES OTHER MANAGED OBJECTS WITH RESULTS SIMILAR TO THE DISPLAYED RESULT FROM WHOSE LISTING OF COMPONENTS THE SELECTION WAS MADE, WHEREIN THE BULK MATCHING DIALOG ACCEPTS FURTHER INPUT FROM A USER TO APPLY THE SELECTION TO ANY OF THE OTHER MANAGED OBJECTS

606 PROVIDE A CONTRIBUTION DIALOG, WHEREIN THE CONTRIBUTION DIALOG ALLOWS A USER TO TRANSMIT INFORMATION ABOUT ANY CREATED MATCHES

FIG. 6

MATCHING USER INTERFACE

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs). A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on storage elements for the purpose of gathering data about these elements, components that process and persist data, applications that use persisted information to enable the management of these environments. ECC identifies the entire process of retrieving the collected data from agents to data persistence as a transaction. Additional software applications may interact with ECC to obtain information that may be used by a user to design and refine the configuration of the storage area network, such as the SAN Advisor family of products, also available from EMC Corporation of Hopkinton, Mass.

SUMMARY

The primary use case of SAN Advisor is to allow the user to take snapshots of their ControlCenter environment for validation against the SAN Advisor rule base. Only twenty-four of SAN Advisor's one hundred sixty rules lookup customer components in the EMC Support Matrix (ESM) to check for ESM compliance, but checking against the ESM is a significant competitive advantage over products that do not offer such functionality. In order to accurately compare the customer environment to the ESM, SAN Advisor must know the host model, the operating system, the Host Bus Adapter (HBA) model/driver/firmware, the PowerPath version, the switch model/firmware, and the array model in ESM terms. In the case of host model and PowerPath version, that information is not available from ControlCenter, so the customer must supply it. For the other items, it means the values returned from ControlCenter must be matched to appropriate ESM components. Some data that SAN Advisor receives from ControlCenter is matched automatically; any data that does not automatically match must be manually matched by a user. This creates a significant initial setup chore for a user. For a large SAN environment, there may be hundreds of items that a user must manually match before SAN Advisory may be used.

Embodiments disclosed below provide a graphical user interface that allows a user to manually match data describing a SAN with components in SAN Advisor. The configuration of the graphical user interface, as well as various tools that it provides, allows a user to quickly and easily manually match items. The GUI receives values that describe parts of a SAN. A matching application is executed as a matching process to attempt to automatically match values to components in SAN Advisor. The matching process may not be able to automatically match all values to components. The GUI displays the received values and the results of the attempted matches. For some values that the matching process is able to automatically match, the GUI will display the result of the match, which may be an identifier of the component of SAN Advisor that the matching process matched to the value. For other values that the matching process is not able to automatically match, the GUI will display those result(s) as such. Additionally, if there are multiple possible matches, the GUI will display that result. The GUI then provides a listing of components connected to each result. The listing of components contains the various types of components which a user may manually match to a received value by selecting one of those components from the listing. In some situations, a list of the components that is most similar to the value received will be included in the listing, which may greatly reduce the amount of time a user has to spend to look through the listing to find the appropriate component. After the user selects a component and creates a match between that component and a value, the GUI may detect that other similar results may be matched in the same way. The GUI may then prompt the user to select which, if any, of these similar results should be matched in the same way, and then match them. This is another feature of the GUI that allows a user to quickly and easily match many values, further reducing the amount of time needed to setup SAN Advisor. Other such time-saving features are explained in greater detail below.

More particularly, in an embodiment there is provided a method of providing a graphical user interface that allows a user to match a managed object that corresponds to a unit of a SAN with a component of a SAN management tool. Matching allows the SAN management tool to validate the configuration of the SAN of which the unit is a part. The method includes receiving information describing a managed object; displaying, on the GUI, the received information and a result of an attempted match of the received information with a component, wherein a result indicates a current status of the attempted match; and providing, on the GUI, a user-selectable listing of components for the displayed result, wherein the selection of a component from the user-selectable listing of components by a user creates a match between the received information for the managed object and the selected component.

In a further embodiment, the method may include determining a listing of components similar to the received information. In this further embodiment, providing may include providing, on the GUI, a user-selectable listing of components for the displayed result, wherein the user-selectable listing includes the determined listing of similar components, and wherein the selection of a component from the user-selectable listing of components by a user creates a match between the received information for the unit and the selected component.

In another further embodiment, the method may include receiving a determination that the information may be matched to multiple components, wherein the determination identifies those multiple components. In this further embodiment, displaying may include displaying, on the GUI, the received information and a result of an attempted match of the received information with a component, wherein the result indicates that the information may be matched to multiple components; and providing may include providing, on the GUI, a user-selectable listing of components for the displayed result, wherein the user-selectable listing includes the identified multiple components, and wherein the selection of a component from the user-selectable listing of components by a user creates a match between the received information for the unit and the selected component.

In yet another further embodiment, the method may include receiving input from a user, wherein the input comprises a selection of a component from the user-selectable listing of components for a result, such that the selection creates a match between the received information for the unit and the selected component. In a related embodiment, the method may include, in response to the input received from the user, providing a bulk matching dialog that indicates other managed objects with results similar to the displayed result from whose listing of components the selection was made, wherein the bulk matching dialog accepts further input from a user to apply the selection to any of the other managed objects. In another related embodiment, the method may include providing a contribution dialog, wherein the contribution dialog allows a user to transmit information about any created matches.

In still another further embodiment, receiving, displaying, and providing may be repeated for a plurality of managed objects. The method may further include displaying, on the GUI, at least a subset of the plurality of managed objects and their associated data, wherein the associated data comprises their corresponding information, any matches with components, and the status of the attempted matches, in a hierarchical listing of managed objects, wherein the hierarchical listing may be expanded or contracted. In a related embodiment, the method may include receiving a filter criterion; and filtering the plurality of managed objects and their associated data so that only those managed objects and associated data that satisfy the received filter criterion are displayed on the GUI.

In yet still another further embodiment, the method may include receiving the result of an attempted match, where the attempted match did not succeed for a reason; and placing a warning icon on the GUI that corresponds to the reason, where the position of the warning icon corresponds to the information that did not match to a component. In a related embodiment, the method may include receiving input from a user, wherein the input comprises placement of a cursor over a warning icon; and displaying at least a portion of the reason on the GUI.

In another embodiment, there is provided a computer system including a memory, a processor, a display, and an interconnection mechanism coupling the memory, the processor and the display allowing communication there between. The memory of the computer system is encoded with a matching GUI application, that when executed in the processor, provides a matching GUI process. The matching GUI process allows a user to match a managed object that corresponds to a unit of a SAN with a component of a SAN management tool, wherein matching allows the SAN management tool to validate the configuration of the SAN of which the unit is a part, by causing the computer system to perform operations of: receiving information describing a managed object; displaying, on the GUI, the received information and a result of an attempted match of the received information with a component, wherein a result indicates a current status of the attempted match; and providing, on the GUI, a user-selectable listing of components for the displayed result, wherein the selection of a component from the user-selectable listing of components by a user creates a match between the received information for the managed object and the selected component.

In yet another embodiment, there is provided a computer program product, stored on computer readable medium, to provide a graphical user interface that allows a user to match a managed object that corresponds to a unit of a SAN with a component of a SAN management tool, wherein matching allows the SAN management tool to validate the configuration of the SAN of which the unit is a part. The computer program product includes computer program code for receiving information describing a managed object; computer program code for displaying, on the GUI, the received information and a result of an attempted match of the received information with a component, wherein a result indicates a current status of the attempted match; and computer program code for providing, on the GUI, a user-selectable listing of components for the displayed result, wherein the selection of a component from the user-selectable listing of components by a user creates a match between the received information for the managed object and the selected component.

It is to be understood that the system of the present application can be embodied solely as a software program, or as a software program operating in conjunction with corresponding hardware. For example, embodiments of the present application may be implemented in EMC's SAN Advisor software application that provides graphical configuration management functionality of storage area network resources. Embodiments of the present application may also be implemented in computer devices that operate the SAN Advisor software. SAN Advisor software is manufactured by EMC Corporation of Hopkinton, Mass., USA.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 2 is a screenshot of an example matching graphical user interface-based provided by the software application that execute on the computer system of FIG. 1.

FIG. 6 illustrates a flowchart of a procedure performed by the system of FIG. 1 when providing a graphical user interface (GUI) that allows a user to manually match a component of a SAN management tool with received information about a managed object that is a unit of a SAN by providing a user-selectable list of components from which a user selects a component, creating a match, which may be transmitted, and which may also result in the display of a bulk matching dialog to create a similar match with similar received information.

DETAILED DESCRIPTION

Generally, disclosed embodiments provide a graphical user interface that allows a user to manually match data describing a SAN with components in a SAN management tool such as EMC Corporation's SAN Advisor. The configuration of the graphical user interface, as well as various tools that it provides, allows a user to quickly and easily manually match items. The GUI receives values that describe parts of a SAN. A matching application is executed as a matching process to attempt to automatically match values to components in SAN Advisor. The matching process may not be able to automatically match all values to components. The GUI displays the received values and the results of the attempted matches. For some values that the matching process is able to automatically match, the GUI will display the result of the match, which may be an identifier of the component of SAN Advisor that the matching process matched to the value. For other values that the matching process is not able to automatically match, the GUI will display those result(s) as such. Additionally, if there are multiple possible matches, the GUI will display that result. The GUI then provides a listing of components connected to each result. The listing of components contains the various types of components which a user may manually match to a received value by selecting one of those components from the listing. In some situations, a list of the components that is most similar to the value received will be included in the listing, which may greatly reduce the amount of time a user has to spend to look through the listing to find the appropriate component. After the user selects a component and creates a match between that component and a value, the GUI may detect that other similar results may be matched in the same way. The GUI may then prompt the user to select which, if any, of these similar results should be matched in the same way, and then match them. This is another feature of the GUI that allows a user to quickly and easily match many values, further reducing the amount of time needed to setup SAN Advisor.

Figure 1:
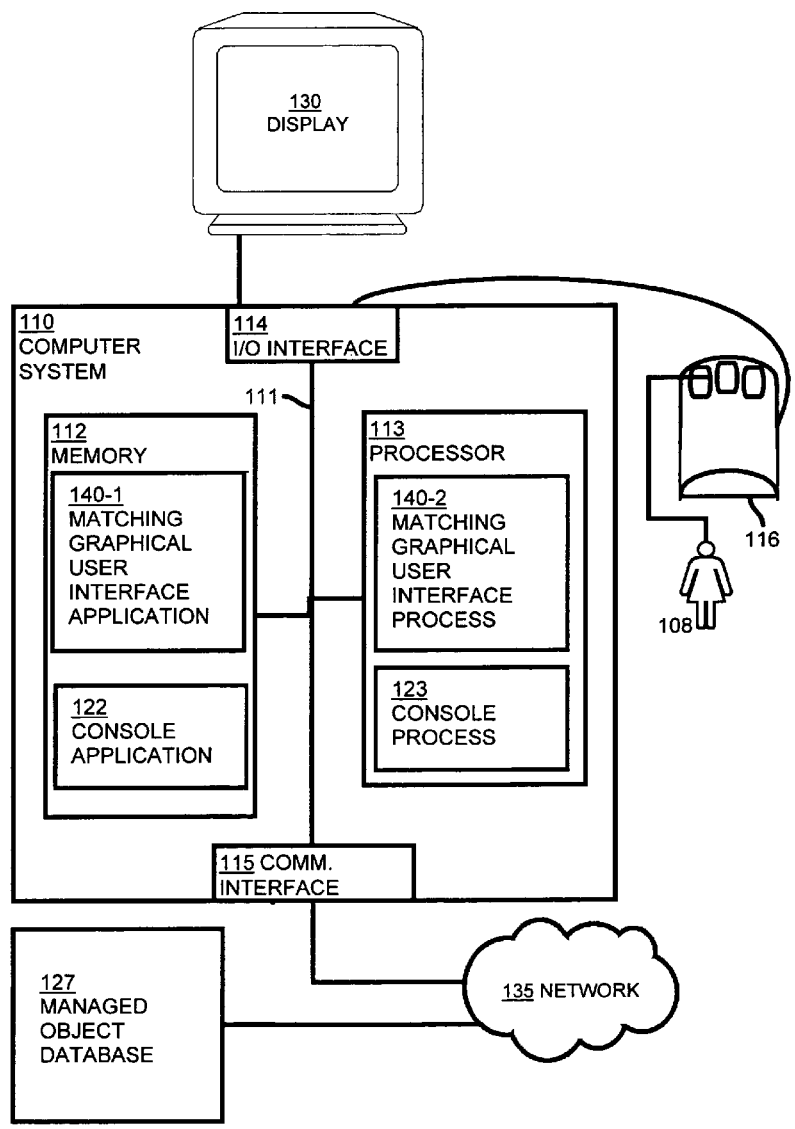
FIG. 1 shows a high-level block diagram of a computer system according to one embodiment disclosed herein.
Figure 3:
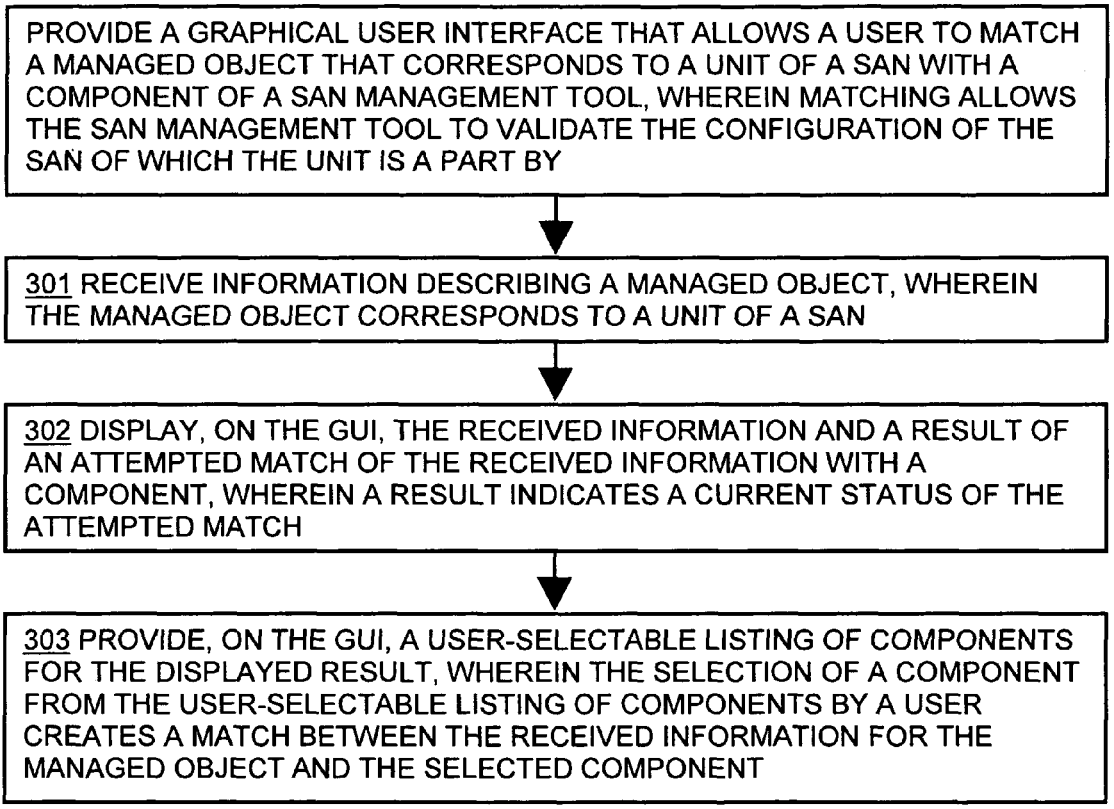
FIG. 3 illustrates a flowchart of a procedure performed by the system of FIG. 1 when providing a graphical user interface (GUI) that allows a user to manually match a component of a SAN management tool with received information about a managed object that is a unit of a SAN by providing a user-selectable list of components.
Figure 4:
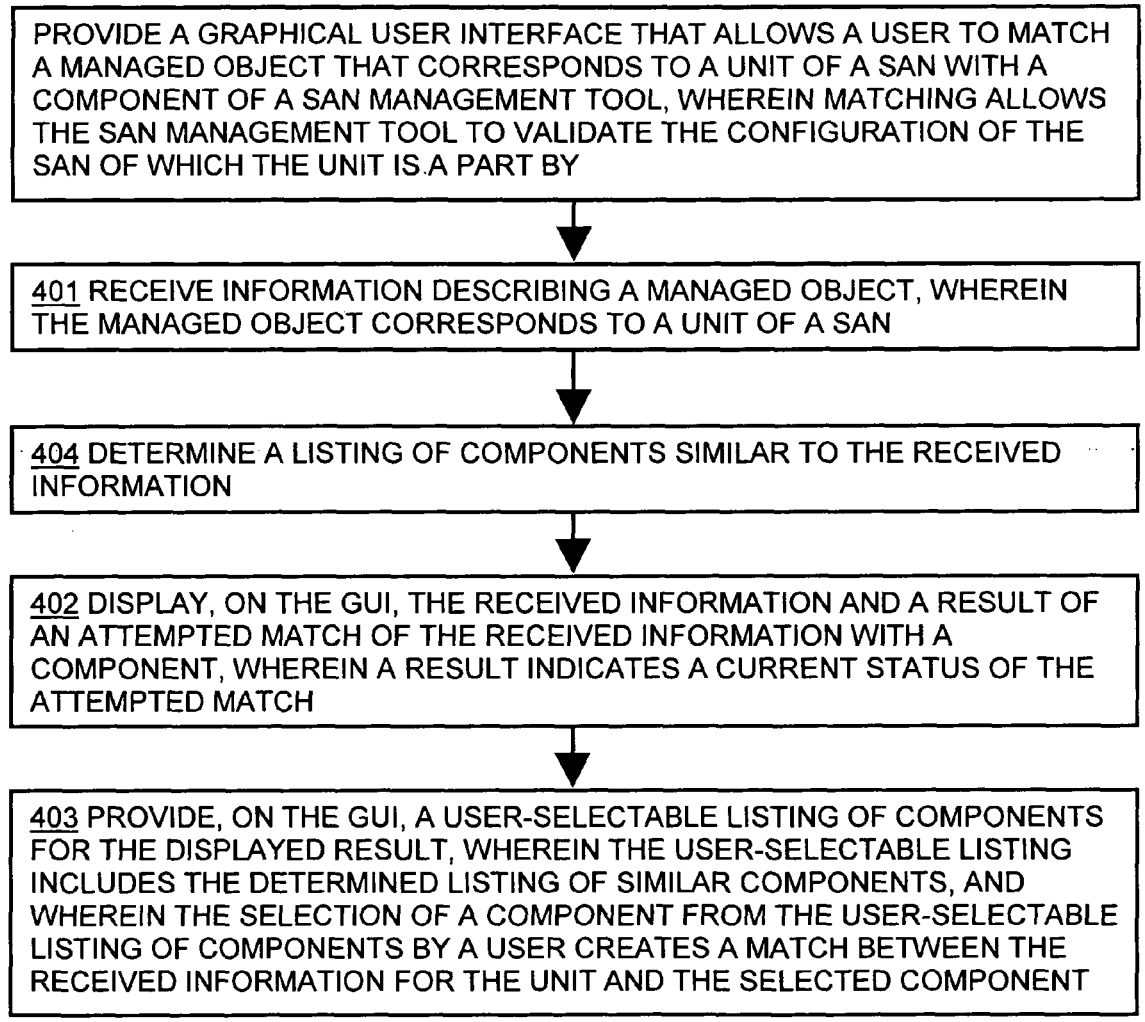
FIG. 4 illustrates a flowchart of a procedure performed by the system of FIG. 1 when providing a graphical user interface (GUI) that allows a user to manually match a component of a SAN management tool with received information about a managed object that is a unit of a SAN by providing a user-selectable list of components that includes a list of components similar to the received information.
Figure 5:
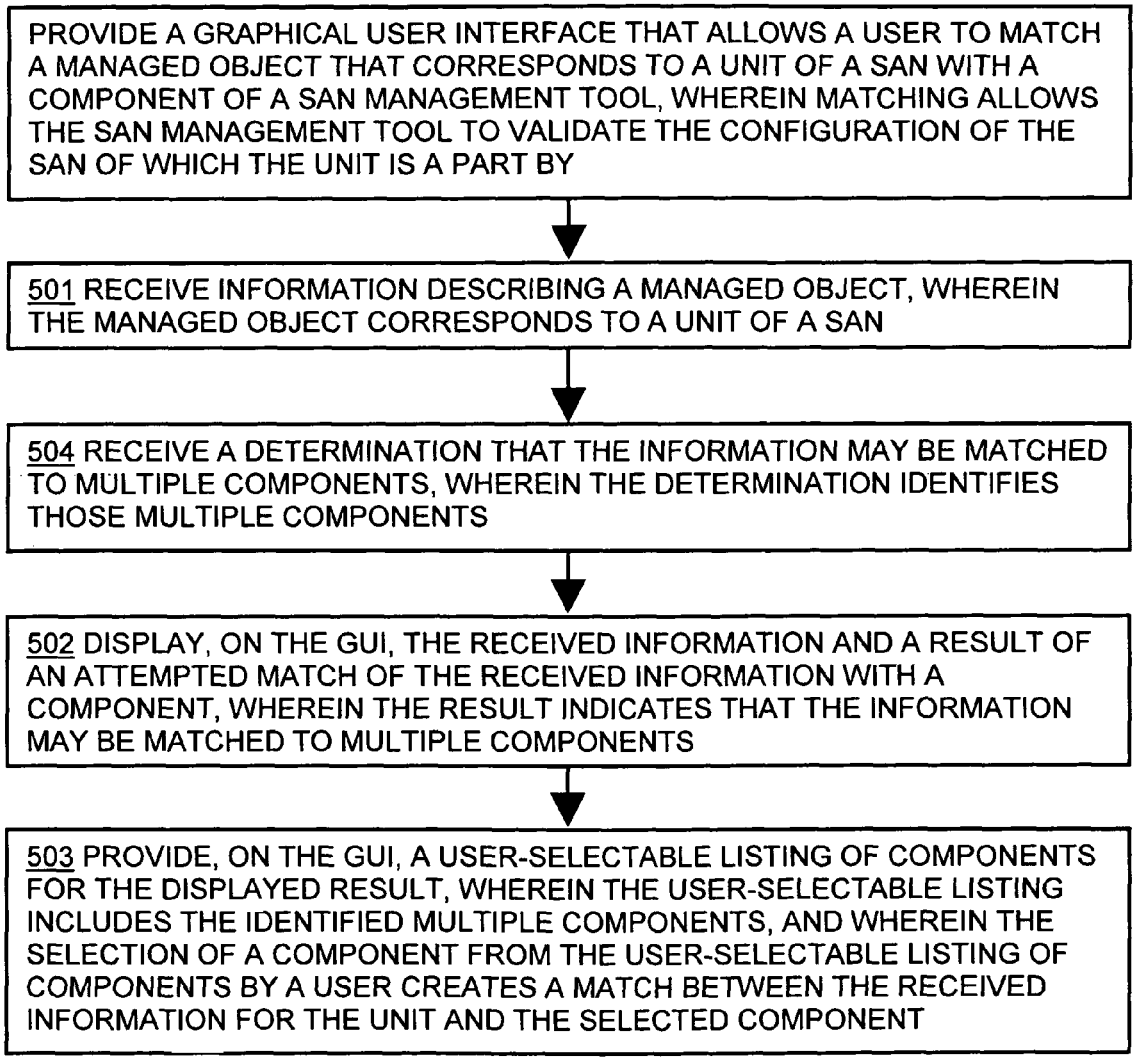
FIG. 5 illustrates a flowchart of a procedure performed by the system of FIG. 1 when providing a graphical user interface (GUI) that allows a user to manually match a component of a SAN management tool with received information about a managed object that is a unit of a SAN by providing a user-selectable list of components that includes a list of multiple components that may match the information.
Figure 7:
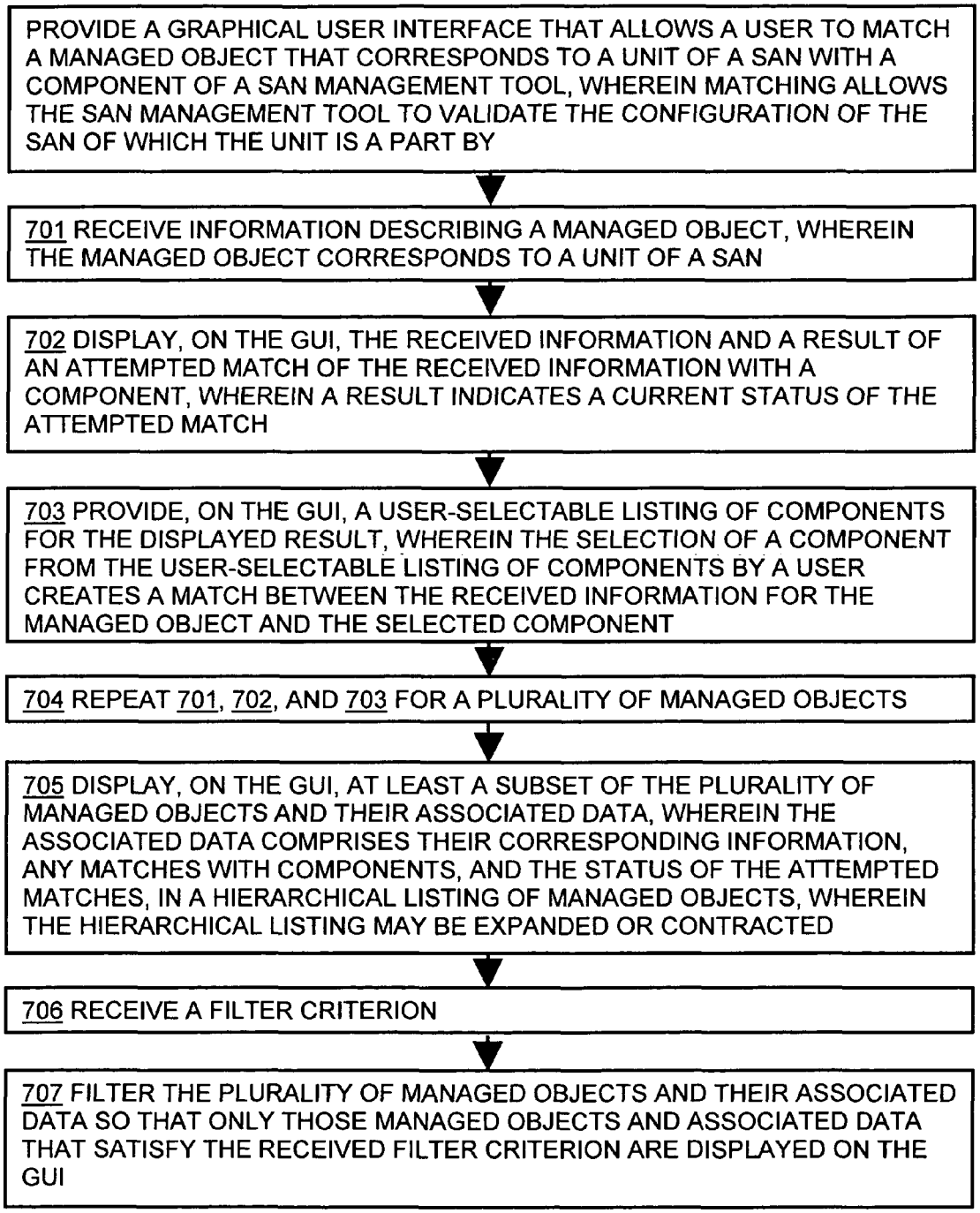
FIG. 7 illustrates a flowchart of a procedure performed by the system of FIG. 1 when providing a graphical user interface (GUI) that allows a user to manually match many components of a SAN management tool with received information about many managed objects that are units of a SAN, wherein the display of the GUI may be adjusted through use of a filter and/or expansion/contraction of a hierarchical list.
Figure 8:
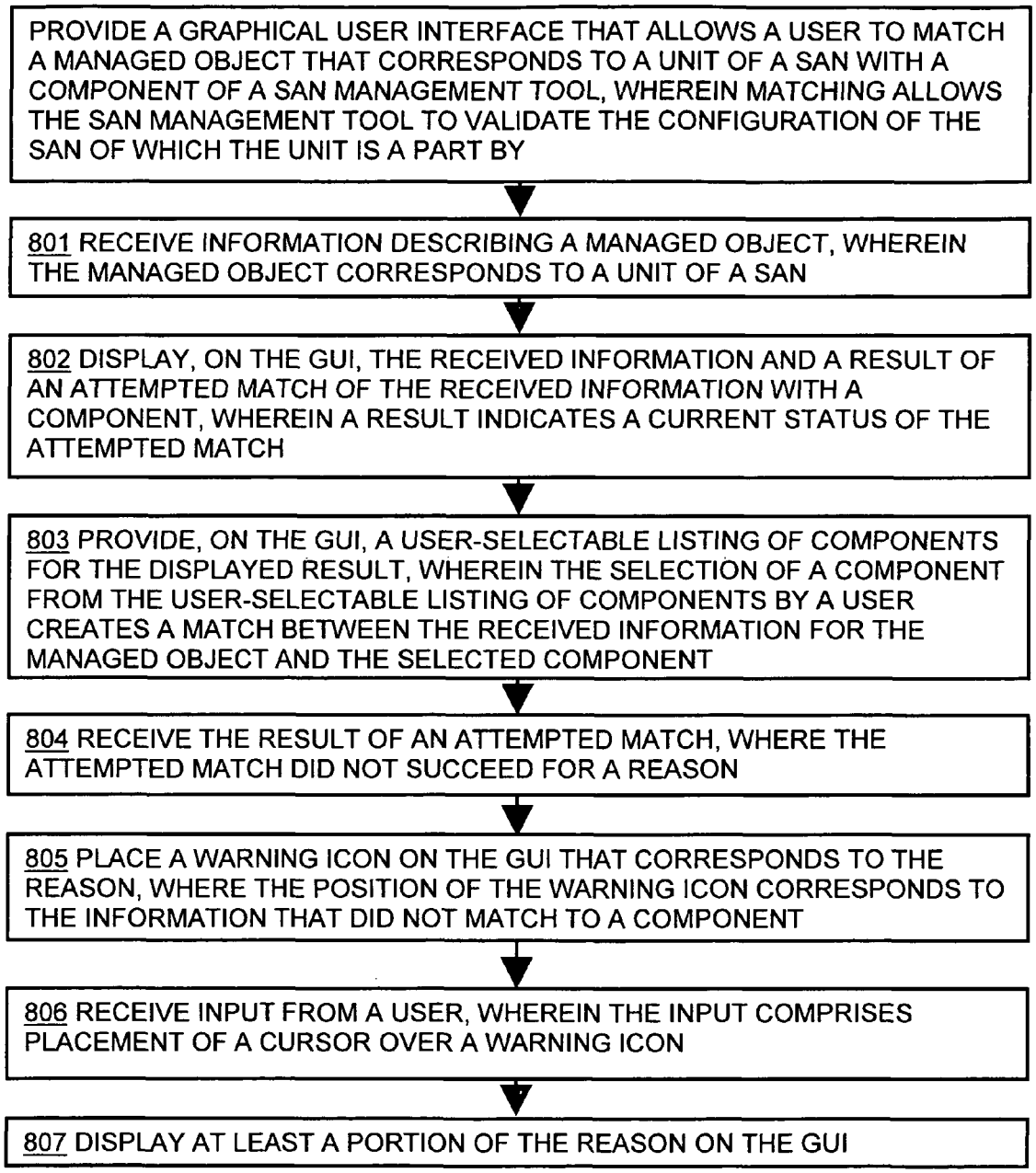
FIG. 8 illustrates a flowchart of a procedure performed by the system of FIG. 1 when providing a graphical user interface (GUI) that allows a user to manually match a component of a SAN management tool with received information about a managed object that is a unit of a SAN and provides warning icons concerning attempted matches.

More particularly, FIG. 1 is a block diagram illustrating example architecture of a computer system 110 that executes, runs, interprets, operates or otherwise performs a matching graphical user interface application 140-1 and a matching graphical user interface process 140-2, suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as a system administrator of a storage area network to provide input commands and generally administer the storage area network through the graphical user interface that is provided on a display 130. The communications interface 115 enables the computer system 110 to communicate with other devices on a network 135, such as but not limited to components of the storage area network (not shown) and a managed object database 127.

The memory system 112 is any type of computer readable medium and in this example is encoded with a matching graphical user interface application 140-1 that includes matching graphical user interface process 140-2. The matching graphical user interface application 140-1 may be embodied as software code such as data and/or logic instructions (e.g., code stored in the memory system 112 or on another computer readable medium such as a removable disk) that supports processing functionality according to different embodiments described herein. A console application 122 may also be embodied as software code in the memory system 112. During operation of the computer system 110, the processor 113 accesses the memory system 112 via the interconnection mechanism 111 in order to launch, run, execute, interpret or otherwise perform the logic instructions of the matching graphical user interface application 140-1 as well as the console application 122. Execution of the matching graphical user interface application 140-1 in this manner produces processing functionality in a matching graphical user interface process 140-2. Similarly, execution of the console application 122 produces processing functionality in a console process 123. In other words, the matching graphical user interface process 140-2 represents one or more portions or runtime instances of the matching graphical user interface application 140-1 performing or executing within or upon the processor 113 in the computer system 110 at runtime.

It is noted that example configurations disclosed herein include the matching graphical user interface application 140-1 itself including the matching graphical user interface process 140-2 (i.e., in the form of un-executed or non-performing logic instructions and/or data). The matching graphical user interface application 140-1 may be stored on a computer readable medium (such as a floppy disk), hard disk, electronic, magnetic, optical or other computer readable medium. The matching graphical user interface application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the matching graphical user interface application 140-1 in the processor 113 as the matching graphical user interface process 140-2. Those skilled in the art will understand that the computer system 110 may include other processes and/or software and hardware components, such as an operating system not shown in this example.

Figure 2:
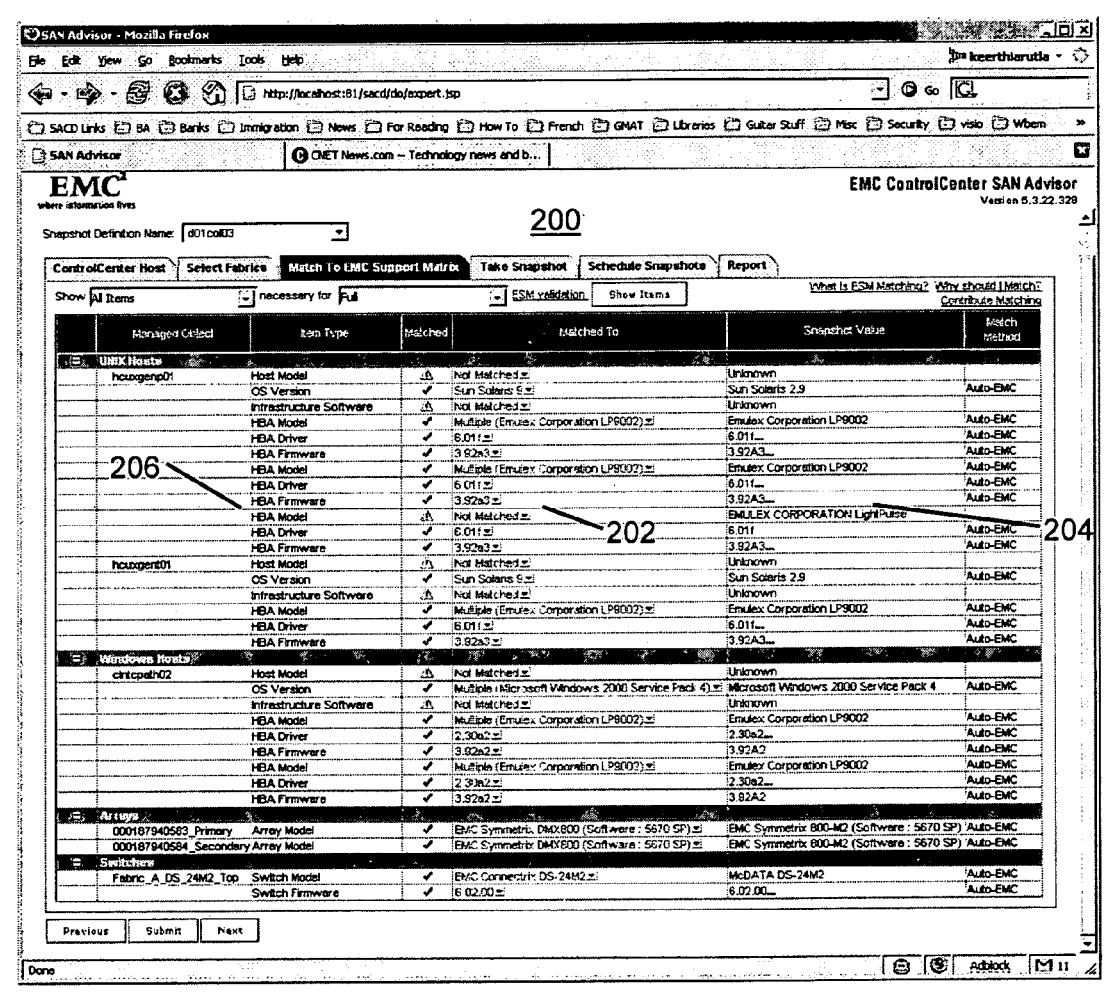

FIG. 2 is a screenshot of the matching graphical user interface application 140-1 executing as the matching graphical user interface process 140-2, as shown on the display 130 (shown in FIG. 1). FIGS. 3-8 illustrate flowcharts of an embodiment of the matching graphical user interface application 140-1 as performed by the system of FIG. 1.

In FIG. 2, a user 108 (shown in FIG. 1), such as a storage area network administrator, using an input device 116 (shown in FIG. 1) on the GUI 200 may select a component 202 from a listing of components (not shown). This is to create a match between the component 202 and the received information 204 that describes a managed object 206 that is part of a SAN. In order for the user to be able to perform this selection, the matching GUI process 140-2 must first have data to display.

The matching GUI process 140-2 receives information describing a managed object, step 301. The matching GUI process 140-2 then displays, on the GUI, the received information, step 302. The matching GUI process 140-2 also displays a result of an attempted match of the received information with a component. A result indicates a current status of the attempted match. This match is performed by a matching process that is described in U.S. Pat. No. 7,673,031, issued on Mar. 2, 2010, filed on Dec. 18, 2006, entitled "RESOURCE MAPPING IN A NETWORK ENVIRONMENT", the entirety of which is herein incorporated by reference.

The matching GUI process 140-2 then provides, on the GUI, a user-selectable listing of components for the displayed result, step 303. This listing may be arranged and organized in any number of ways. For example, the listing of components may include all possible components. Such a listing may be broken down into various sub-listings, wherein each sub-listing corresponds to a different type of component; for example, the sub-listings may arranged according to the manufacturer of the component. Variations on this listing as described below provide added functionality to the GUI. Whatever the composition and/or organization of the listing of components, the selection of a component from the user-selectable listing of components by a user creates a match between the received information for the managed object and the selected component. This selection process is also described further below.

One potential arrangement for the listing of components is to provide, at or near the top of the listing, a list of components that are similar to the received information. Providing a list of similar components may likely remove the need for a user to examine the totality of the listing to determine the matching component. This will allow the user to more quickly and easily manually match components and received information. The matching GUI process 140-2 would determine a listing of components similar to the received information, step 404, after that information had been received, step 401. The matching GUI process 140-2 would then display, on the GUI, the received information and a result of an attempted match of the received information with a component, step 402. The matching GUI process 140-2 could then provide, on the GUI, a user-selectable listing of components for the displayed result that includes the determined listing of similar components, step 403. The selection of a component from the user-selectable listing of components, including the determined listing of similar components, by a user creates a match between the received information for the unit and the selected component.

Another potential arrangement for the listing of components may occur when there are multiple components that might match to the received information. For example, the received information might describe a particular part of a SAN, but might not include the manufacturer of the part. Such a part may be produced by many manufacturers. Thus, the listing of components may include many instances of this part, with each particular instance identified by its manufacturer. These components may be spread throughout the listing of components; alternatively the matching GUI process 140-2 may group them together at or near the top of the listing of components, to make them easily accessible by a user. In this situation, the matching GUI process 140-2 receives a determination that the information may be matched to multiple components, wherein the determination identifies those multiple components, step 504. This occurs after the matching GUI process 140-2 has received the information, step 501. The matching GUI process 140-2 then displays, on the GUI, the received information and a result of an attempted match of the received information with a component, wherein the result indicates that the information may be matched to multiple components, step 502. The matching GUI process 140-2 provides, on the GUI, a user-selectable listing of components for the displayed result, wherein the user-selectable listing includes the identified multiple components, step 503.

In order for a user to match a component and received information, the matching GUI process 140-2 must receive input from the user. After receiving information, step 601, displaying the information and a result, step 602, and providing a user-selectable listing of components, step 603, the matching GUI process 140-2 receives input from a user, step 604, when the user 116 (shown in FIG. 1) uses an input device 108 (shown in FIG. 1) to select a component from the provided user-selectable listing of components. The selection creates a match between the received information for the unit and the selected component.

Upon detecting that a match has been created due to a selection of a component received from a user as described above, the matching GUI process 140-2 may provide a bulk matching dialog, step 605. The bulk matching dialog indicates that there are other managed objects with results similar to the displayed result from whose listing of components the selection was made. For example, if the component was selected from a listing of components provided with a result of "Not Matched" for a particular received information value, the matching GUI process 140-2 may provide the bulk matching dialog when matching GUI process 140-2 detects that there are other received information values similar to that value that also have a result of "Not Matched". The bulk matching dialog allows the user 108 to select, by providing input to the matching GUI process 140-2 via an input device 116, which if any of those other similar received information values will have the same matching as the just-created matching. Thus, the bulk matching dialog accepts further input from a user to apply the selection to any of the other managed objects. This is yet a further feature that allows a user 116 of the matching GUI to quickly and easily make create matches at the same time.

The matching GUI process 140-2 allows a user to provide any matches made, either by the matching process or by the user providing input to the matching GUI process 140-2 to manually match a component and received information, to another entity, such as the manufacturer or developer of the matching process. By providing this data, the user enables the manufacturer or developer to incorporate new matches into the matching process. This may improve the matching process, so that future versions of the matching process do not require any many manual matches to be made by a user. To enable a user to do this, the matching GUI process 140-2 provides a contribution dialog, wherein the contribution dialog allows a user to transmit information about any created matches, step 606. This information may be transmitted via any known means, such as a wired or wireless connection to a network, for example but not limited to the Internet. The matching GUI process 140-2 removes any personal or other identifying data from the data prior to transmission, to protect the privacy of the user and the SAN/SANs he/she manages. Thus, the matching GUI process 140-2 transmits only the matchings between received information and components.

With a large number of parts in a SAN, a typical matching GUI will include more data than may easily be shown on a single screen of a display, such as the display 130 shown in FIG. 1. While a user 108 may provide input via input device 116 to a scrollbar or other mechanism for changing what portion of the matching GUI is shown on the display 130, to parse through tens or even hundreds of screens worth of information to find a particular managed object or other data is inefficient. Thus, the organization of the data on the matching GUI is such that views of data may be quickly and easily manipulated.

One example of this is when receiving information, step 701, displaying the received information and a result of an attempted match, step 702, and providing a user-selectable listing of components, step 703, are repeated for a plurality of managed objects, step 704. The matching GUI process 140-2 displays, on the GUI, at least a subset of the plurality of managed objects and their associated data, wherein the associated data comprises their corresponding information, any matches with components, and the status of the attempted matches, step 705. The matching GUI process 140-2 displays this in a hierarchical listing of managed objects. Such a hierarchical listing may be in the form of, for example but not limited to, a tree structure or a table structure. Whatever the structure of the hierarchical listing, it may be expanded or contracted through user input. For example, if the hierarchical listing structure is that of a table, one or more rows and/or columns of the table may be hidden or shown according to input received from the user 108 by the matching GUI process 140-2 via an input device 116.

Further, the matching GUI process 140-2 includes one or more filters that may be used to change how the managed objects and their associated data are shown on the display 130, again regardless of what type of structure the managed objects and their associated data are organized in. The setting of a filter is stored such that, after the filter has been applied by matching GUI process 140-2, should a user exit from or otherwise leave the matching GUI, upon returning to the matching GUI, the way the information is shown on the display 130 will return to the stored state.

The matching GUI process 140-2 receives a filter criterion, step 706. This filter criterion may be selected by a user via an input device from a provided list, or may be otherwise entered by a user via an input device through an type of graphical user interface input mechanism, such as but not limited to a text box, a dialog, a menu, or any other similar mechanism. The matching GUI process 140-2 then filters the plurality of managed objects and their associated data so that only those managed objects and associated data that satisfy the received filter criterion are displayed on the GUI, step 707.

In one example, the matching GUI process 140-2 may include two filters that may be arranged to make a sentence according to the form "Show [State Combo] necessary for [Validation Combo] ESM validation". Examples of such an arrangement may include, but are not limited to, Show Not Matched Items necessary for No ESM validation; Show All Items necessary for Base Connectivity ESM validation; Show Matching Issues necessary for Full ESM validation; Show Not Matched Items necessary for Fibre Connectivity: Switch ESM validation; Show Auto-Matched Items necessary for Full ESM validation; and Show Manually Matched Items necessary for Full ESM validation.

When a match between received information and a component does not succeed, or is not proper, the matching GUI process 140-2 will display a warning to a user to inform them of this fact. For example, after the matching GUI process 140-2 receives information, step 801, displays the received information and a result of an attempted match, step 802, and provides a user-selectable listing of components, step 803, the matching GUI process 140-2 may receive the result of an attempted match, where the attempted match did not succeed for a reason, step 804. The matching GUI process 140-2 will then place a warning icon on the GUI that corresponds to the reason, where the position of the warning icon corresponds to the information that did not match to a component, step 805. If a user 108 provides input via an input device 116, such as by placing a cursor over the warning icon, the matching GUI process 140-2 will receive that input from the user, step 806, and display at least a portion of the reason on the GUI. This allows the user to quickly and easily learn of the warning or error in the match, and further allows the matching GUI process 140-2 to identify potential problems by using generic icons, that may have a number of meanings, instead of specific icons, each with a particular meaning. The user is also then relieved of the obligation of learning a number of such specific icons and what each means in order to quickly determine what issue(s) an icon may be identifying.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of providing a graphical user interface (GUI) that allows a user to match a managed object that corresponds to a unit of a storage area network (SAN) with a component of SAN management tool, wherein matching allows the SAN management tool to validate the configuration of the SAN of which the unit is a part, the method comprising:

receiving information describing a managed object;

displaying, on the GUI, the received information and a result of an attempted match of the received information with a component, wherein a result indicates a current status of the attempted match;

providing, on the GUI, a user-selectable listing of components for the displayed result, wherein the selection of a component from the user-selectable listing of components by a user creates a match between the received information for the managed object and the selected component;

receiving input from a user, wherein the input comprises a selection of a component from the user-selectable listing of components for a result, such that the selection creates a match between the received information for the unit and the selected component; and in response to the input received from the user, providing a bulk matching dialog that indicates other managed objects with results similar to the displayed result from whose listing of components the selection was made, wherein the bulk matching dialog accepts further input from a user to apply the selection to any of the other managed objects.

2. The method of claim 1 comprising:

determining a listing of components similar to the received information;

and wherein providing comprises:

providing, on the GUI, a user-selectable listing of components for the displayed result, wherein the user-selectable listing includes the determined listing of similar components, and wherein the selection of a component from the user-selectable listing of components by a user creates a match between the received information for the unit and the selected component.

3. The method of claim 1 comprising:

receiving a determination that the information may be matched to multiple components, wherein the determination identifies those multiple components;

wherein displaying comprises:

displaying, on the GUI, the received information and a result of an attempted match of the received information with a component, wherein the result indicates that the information may be matched to multiple components;

and wherein providing comprises:

providing, on the GUI, a user-selectable listing of components for the displayed result, wherein the user-selectable listing includes the identified multiple components, and wherein the selection of a component from the user-selectable listing of components by a user creates a match between the received information for the unit and the selected component.

4. The method of claim 1 comprising:

providing a contribution dialog, wherein the contribution dialog allows a user to transmit information about any created matches.

5. The method of claim 1, wherein receiving, displaying, and providing are repeated for a plurality of managed objects, the method further comprising:

displaying, on the GUI, at least a subset of the plurality of managed objects and their associated data, wherein the associated data comprises their corresponding information, any matches with components, and the status of the attempted matches, in a hierarchical listing of managed objects, wherein the hierarchical listing may be expanded or contracted.

6. The method of claim 5 comprising:

receiving a filter criterion; and filtering the plurality of managed objects and their associated data so that only those managed objects and associated data that satisfy the received filter criterion are displayed on the GUI.

7. The method of claim 1 comprising:

receiving the result of an attempted match, where the attempted match did not succeed for a reason; and placing a warning icon on the GUI that corresponds to the reason, where the position of the warning icon corresponds to the information that did not match to a component.

8. The method of claim 7 comprising:

receiving input from a user, wherein the input comprises placement of a cursor over a warning icon; and displaying at least a portion of the reason on the GUI.

9. A computer program product, stored on a non-transitory computer readable storage medium with computer readable code stored thereon, to provide a graphical user interface (GUI) that allows a user to match a managed object that corresponds to a unit of a storage area network (SAN) with component of a SAN management tool, wherein matching allows the SAN management tool to validate the configuration of the SAN of which the unit is a part, the computer program product comprising:

computer program code for receiving information describing a managed object;

computer program code for displaying, on the GUI, the received information and a result of an attempted match of the received information with a component, wherein a result indicates a current status of the attempted match;

computer program code for providing, on the GUI, a user-selectable listing of components for the displayed result, wherein the selection of a component from the user-selectable listing of components by a user creates a match between the received information for the managed object and the selected component;

computer program code for receiving input from a user, wherein the input comprises a selection of a component from the user-selectable listing of components for a result, such that the selection creates a match between the received information for the unit and the selected component; and computer program code for, in response to the input received from the user, providing a bulk matching dialog that indicates other managed objects with results similar to the displayed result from whose listing of components the selection was made, wherein the bulk matching dialog accepts further input from a user to apply the selection to any of the other managed objects.

10. The computer program product of claim 9 comprising:

computer program code for determining a listing of components similar to the received information;

and wherein computer program code for providing comprises:

computer program code for providing, on the GUI, a user-selectable listing of components for the displayed result, wherein the user-selectable listing includes the determined listing of similar components, and wherein the selection of a component from the user-selectable listing of components by a user creates a match between the received information for the unit and the selected component.

11. The computer program product of claim 9 comprising:

computer program code for receiving a determination that the information may be matched to multiple components, wherein the determination identifies those multiple components;

wherein computer program code for displaying comprises:

computer program code for displaying, on the GUI, the received information and a result of an attempted match of the received information with a component, wherein the result indicates that the information may be matched to multiple components;

and wherein computer program code for providing comprises:

computer program code for providing, on the GUI, a user-selectable listing of components for the displayed result, wherein the user-selectable listing includes the identified multiple components, and wherein the selection of a component from the user-selectable listing of components by a user creates a match between the received information for the unit and the selected component.

12. A computer system comprising:

a memory;

a processor;

a display;

an interconnection mechanism coupling the memory, the process and the display allowing communication there between;

wherein the memory is encoded with a matching graphical user interface (GUI) application, that when executed in the processor, provide a matching GUI process that allows a user to match a managed object that corresponds to a unit of a storage area network (SAN) with a component of a SAN management tool, wherein matching allows the SAN management tool to validate the configuration of the SAN of which the unit is a part, by causing the computer system to perform operations of;

receiving information describing a managed object;

displaying, on the GUI, the received information and a result of an attempted match of the received information with a component, wherein a result indicates a current status of the attempted match;

providing, on the GUI, a user-selectable listing of components for the displayed result, wherein the selection of a component from the user-selectable listing of components by a user creates a match between the received information for the managed object and the selected component;

receiving input from a user, wherein the comprises a selection of a component from the user-selectable listing of components for a result, such that the selection creates a match between the received information for the unit and the selected component; and in response to the input received from the user, providing a bulk matching dialog that indicates other managed objects with results similar to the displayed result from whose listing of components the selection was made, wherein the bulk matching dialog accepts further input from a user to apply the selection to any of the other managed objects.

13. The computer system of claim 12 comprising:

determining a listing of components similar to the received information;

and wherein providing comprises:

providing, on the GUI, a user-selectable listing of components for the displayed result, wherein the user-selectable listing includes the determined listing of similar components, and wherein the selection of a component from the user-selectable listing of components by a user creates a match between the received information for the unit and the selected component.

14. The computer system of claim 12 comprising:

receiving a determination that the information may be matched to multiple components, wherein the determination identifies those multiple components;

wherein displaying comprises:

displaying, on the GUI, the received information and a result of an attempted match of the received information with a component, wherein the result indicates that the information may be matched to multiple components;

and wherein providing comprises:

providing, on the GUI, a user-selectable listing of components for the displayed result, wherein the user-selectable listing includes the identified multiple components, and wherein the selection of a component from the user-selectable listing of components by a user creates a match between the received information for the unit and the selected component.

* * * * *